United States Patent [19]

Urella

[11] Patent Number: 4,557,454

[45] Date of Patent: Dec. 10, 1985

[54] LIFT MECHANISM FOR A DENTAL CHAIR

[76] Inventor: Anthony R. Urella, R.D. #2, Bernville, Pa. 19506

[21] Appl. No.: 515,486

[22] Filed: Jul. 20, 1983

[51] Int. Cl.⁴ ............................................ F16M 13/00

[52] U.S. Cl. .................................... 248/422; 248/669; 297/348

[58] Field of Search ............... 248/422, 157, 669, 651, 248/188.4; 297/347, 348; 108/147; 5/81 R; 308/244, 3 C; 403/148; 254/7 B, 7 C, 7 R, 103; 187/95

[56] References Cited

U.S. PATENT DOCUMENTS

| | | | |
|---|---|---|---|
| 170,012 | 11/1875 | Newbrough | 297/384 |
| D. 232,777 | 9/1974 | Fortnam | D83/1 E |
| 455,168 | 5/1891 | Case | 297/348 |
| 657,360 | 9/1900 | Ritter | 297/347 |
| 675,674 | 5/1901 | Ritter | 297/347 |
| 1,101,598 | 6/1914 | Weinke | 254/7 C |
| 1,282,164 | 10/1918 | Adsit | 297/347 |
| 1,802,362 | 4/1931 | Walter | 108/147 |
| 1,814,610 | 7/1931 | Stevelman | 187/95 |
| 2,034,624 | 3/1936 | Lamb | 297/348 |
| 2,187,283 | 1/1940 | Scheutz | 297/348 |
| 2,578,382 | 12/1951 | Thompson | 297/348 |
| 2,608,239 | 8/1952 | Gorden | 397/348 |
| 3,042,372 | 7/1962 | Zeigler | 254/7 C |
| 3,215,402 | 11/1965 | Hott et al. | 254/7 B |
| 3,271,859 | 9/1966 | Horowitz et al. | 108/147 |
| 3,405,781 | 10/1968 | Brown | 254/7 R |
| 3,472,488 | 10/1969 | Naughton | 108/147 |
| 3,608,462 | 9/1971 | Groshong | 95/86 |
| 3,890,907 | 6/1975 | Peterson | 108/136 |
| 3,894,601 | 7/1975 | Gestring | 180/26 R |
| 3,908,565 | 9/1975 | Burnett | 108/147 |
| 4,088,378 | 5/1978 | Pallant et al. | 308/244 |
| 4,442,922 | 4/1984 | Johannson | 187/95 |

FOREIGN PATENT DOCUMENTS 630472 10/1949 United Kingdom ................ 248/669

OTHER PUBLICATIONS

Pelton & Crane, "Coachman".
Kaycor International, "The K3000 Ergonomic Dental Chair".
A-Dec Inc., "Priority".
Gard Dental Products, "Sentry 21".
Chayes Virginia, "Voyager".

*Primary Examiner*—Ramon S. Britts
*Assistant Examiner*—David M. Purol
*Attorney, Agent, or Firm*—Huff & Hanson

[57] ABSTRACT

Disclosed is a lift mechanism which is particularly adapted for use in a dental chair. The lift mechanism comprises a base plate, a support attached to and extending vertically from the base plate, the support having two planar side surfaces parallel to each other, and a diagonal strut attached near the upper portion of the support and to the base plate. The mechanism further comprises a carriage structure extending horizontally from and traveling on the support and having two parallel horizontal arms extending in one direction from the support. The carriage structure also includes two horizontal rollers between the arms, the rollers contacting the parallel side surfaces of the support. The rollers are of length approximately equal to the width of the contacted side surface and the roller nearest to the portion of the arms extending from the support is located lower in the carriage structure than the other roller. The mechanism also contains a worm gear passing through an internally threaded nut attached to the carriage structure and a motor for rotating the worm gear so as to cause the carriage structure to travel on the support. A dental chair seat is adapted to be attached to the arms of the carriage structure.

20 Claims, 4 Drawing Figures

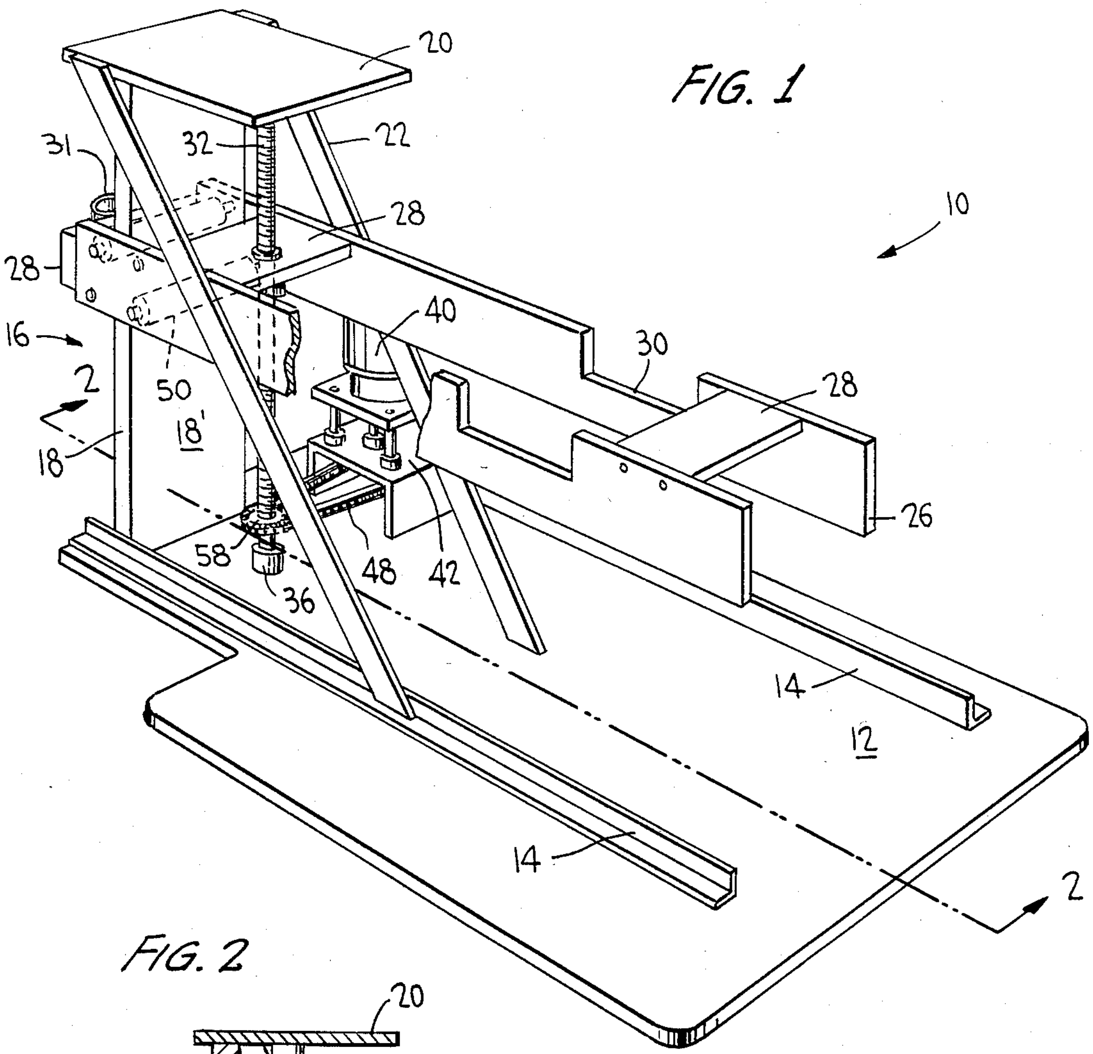
FIG. 1
FIG. 2
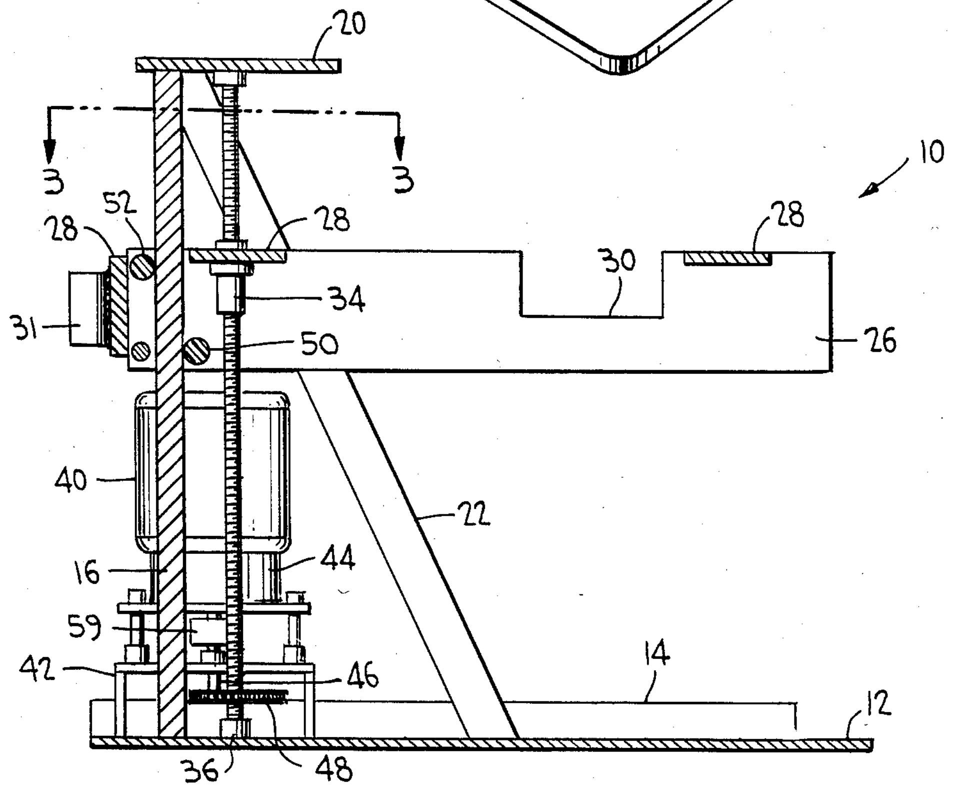

LIFT MECHANISM FOR A DENTAL CHAIR

BACKGROUND OF THE INVENTION

The present invention relates generally to lift mechanisms and, more particularly, to lift mechanisms of the vertical travel type which are adapted to be used in raising and lowering a dentist's chair seat.

The practice of dentistry has progressed significantly over the years and, as a consequence, so have the requirements for modern dental equipment. In particular, more and more dentists have adopted a sitting as opposed to standing position in performing dentistry procedures. Consequently, a modern dental chair must be capable of being lowered to almost a floor level position to enable a sitting dentist to practice upon a patient who prefers to sit erect while, at the same time, be capable of elevating the chair to height sufficient to enable a standing dentist to practice. Thus, the range of elevations for a dental chair is fairly significant, e.g., from about 6 inches to about three feet or more.

Conventional lift mechanisms for dental chairs generally have a very limited range of elevation since if they are extended to above about a foot or more, the mechanism may tend to become quite unstable. For example, lift mechanisms utilizing telescoping members (see for example U.S. Pat. No. 657,360 to Ritter) tend to become unstable after the telescoping member has been extended by half its length or more since the combined strength of the members tends to decrease upon telescoping. In a like manner, lift mechanisms using a scissors-type jack (see, for example, U.S. Pat. No. 3,472,488 to Naughton) become more and more unstable as the jack is extended.

In addition, conventional lift mechanisms for dental chairs are generally located beneath the center portion of the chair seat. For a dentist who wishes to practice in the sitting position, the lift mechanism can present an obstacle for the comfortable positioning of his feet and legs and can limit access to a patient to a relatively few angles. This central positioning of the lift mechanism also physically limits the length of its extensible members for the lift mechanism and therefore limits the upward elevation range for the chair. The bulk of the cental positioned lift mechanism also limits the downward movement of the chair to a relatively high position and thereby may effectively prevent a setting dentist from working on a tall patient who wishes to sit in an erect position.

Conventional lift mechanisms also sometimes do not lift the chair seat totally in a vertical direction but rather lift with some forward or backward movement as well as with a vertical component. As a result a dentist using such a mechanism in a dental chair would have to change positions when adjusting the elevation of the chair seat in order to remain in the same horizontal position relative to the patient.

Advances in the field of dentistry have also made it necessary that the dentist have a wide array of dental accessories such as drills, stands, hoses, tools and the like at his immediate disposal when tending to a patient. Consequently, such dental accessories should preferably be carried by the chair itself so that, as the chair is raised or lowered to accommmodate the position of the dentist relative to a patient, the dental accessories will always be within easy reach. Conventional lift mechanisms for dental chairs have generally been unable to carry this additional weight due to the inherent instability of the mechanism as the chair seat is elevated, particularly at the higher elevations of the seat.

In view of the various deficiencies in conventional lift mechanisms for dental chairs, it would be desirable to provide a lift mechanism which, among other things, is stable at all positions, particularly at elevated positions, gives essentially unlimited access to the underside of the chair seat, enables dental accessories to be carried by the dental chair, can be lowered to a relatively low position relative to a floor, and enables a stable, smooth and essentially vertical travel of the chair seat with a minimum of noise and vibration.

SUMMARY OF THE INVENTION

Accordingly, it is therefore a feature of the present invention to provide a lift mechanism particularly adapted for use with dental chairs which has a high stability at all elevations of the mechanism.

It is another feature of the invention to provide a lift mechanism which may be lowered to a relatively low elevation.

It is yet a further feature of the invention to provide a lift mechanism, which when incorporated as part of a dental chair, allows essentially unlimited access beneath the chair seat.

It is another feature of the invention to provide a lift mechanism which is capable of elevating, with stability, a dental seat as well as dental accessories with a minimum of noise.

Briefly, the invention in its broader aspects comprehends a lift mechanism comprising a base plate of sufficient dimensions to provide stability for the mechanism, a support member attached to the base plate and extending generally vertically from the base plate, the support member having four generally planar side surfaces, at least two of the side surfaces being parallel to each other, and at least one diagonal strut attached at one end near the upper portion of the support member and at the other end to the base plate. The lift mechanism further includes a carriage structure extending generally horizontally from and traveling on the support member, the carriage structure comprising two parallel horizontal arms extending primarily in one direction from the support member and two horizontal rollers between the arms, one of the rollers contacting one of the parallel side surfaces of the support member and the other of the rollers contacting the other parallel side surface. The rollers are of length approximately equal to the width of the contacted side surface of the support member and the roller nearest to the portion of the arms extending from the support member is located lower in the carriage structure than the other roller. The lift mechanism also includes a worm gear extending from the base plate and passing through an internally threaded nut attached to the carriage structure and means for rotating the worm gear so as to cause the carriage structure to travel on the support member.

The present invention also comprehends a dental chair comprising the above-described lift mechanism and a dental seat supported by the arms of the carriage structure.

Further objects, advantages and features of the present invention will become more fully apparent from a detailed consideration of the arrangement and construction of the constituent parts as set forth in the following specification taken together with the accompanying drawing.

BRIEF DESCRIPTION OF THE DRAWING

In the drawing,

FIG. 1 is a perspective view of a lift mechanism in accordance with the present invention, FIG. 2 is a side, cross-sectional view of the lift mechanism of FIG. 1.

DETAILED DESCRIPTION OF THE PREFERRED EMBODIMENTS

Figure 3:
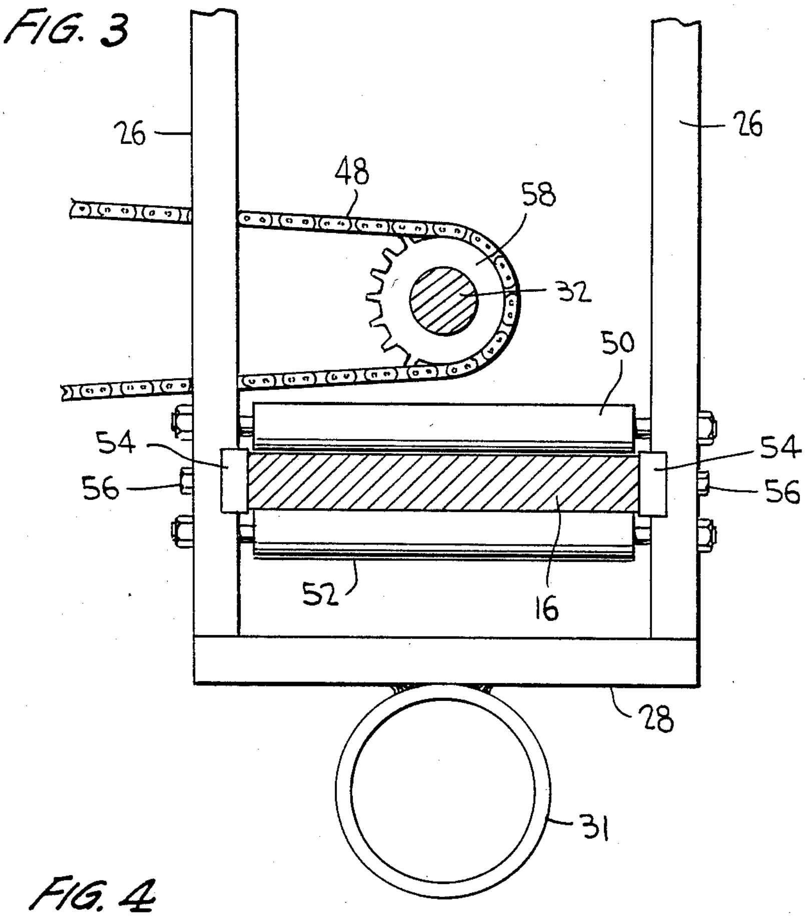
FIG. 3 is a top, cross-sectional view of a portion of the lift mechanism of FIG. 1

Referring now to FIG. 1, shown is lift mechanism 10 in accordance with the present invention. Lift mechanism 10, as the name implies, provides a power driven, vertically extending lifting means which is stable in essentially all lateral directions and which remains stable, within the limits of the mechanism, regardless of the height to which the mechanism is elevated.

Lift mechanism 10 comprises horizontal base plate 12 of a generally rectangular configuration. Base plate 12 is of sufficient dimensions to provide both lateral and front stability for mechanism 10, particularly when lift mechanism is used in conjunction with a dental chair seat, e.g., see FIG. 4. For most dental applications, dimensions for the base plate 12 of about three feet by about three feet or more are generally satisfactory. Base plate 12 may, if desired, be provided with leveling means (not shown) such as adjustable bolts extending through the corners of the base plate.

Attached to base plate 12 by welding and the like are two parallel channels 14 which provide convenient points of attachment for other components of lift mechanism 10 to base plate 12. Extending vertically from between channels 14 and attached to base plate 12 is support member 16. Member 16 has four rectangular, generally planar side surfaces 18'. In this embodiment of the invention, opposing side surfaces 18 of support member 16 are parallel to each other and opposing side surfaces 18' are parallel to each other. Other configurations for support member 16 may be suitable for the purposes of the present invention so long as the support member has at least two parallel, generally planar side surfaces. Thus, other appropriate configurations for support member 16 include cross-sections which are parallelograms, trapezoids and the like. For the purposes of stability, it is important for the purposes of the present invention that opposing parallel side surfaces 18' have a significant width relative to its height, e.g., about 1 to about 5 or less, as will be explained hereinafter. In addition, support member 16 may be partially or completely hollow in the vertical direction.

Attached to the top of support member 16 is upper plate 20 which extends generally horizontally. Providing lateral stability for support member 16 are two parallel diagonal struts 22 which respectively extend from upper plate 20 adjacent the upper portion of the support member down to either channel 14 or base plate 12. Carriage structure 24 comprising horizontal arms 26 extending primarily in one direction from support member 16 and connected to each other by a plurality of cross-pieces 28. Carriage structure 24 is capable of traveling or riding essentially on the entire vertical length of support member 16. The object to be lifted by lift mechanism 10, e.g., a dental seat, is attached to arms 26 of carriage structure 24. Notches 30 in arms 26 of carriage structure 24 help provide for secure attachment of such an object, particularly a dental seat. Holder 31 is attached to the rear of carriage structure 24 to allow the convenient attachment of accessories such as dental appliances, e.g., lamps, delivery units and the like. Preferred materials for fabricating base plate 12, support member 16, struts 22 and carriage structure 24 include hot and cold rolled steels.

As is best shown in FIG. 2, carriage structure 24 may be caused to travel either upwardly or downwardly on support member 16 by rotation of acme threaded shaft 32 and cooperating threaded nut 34 affixed to cross-piece 28 of the carriage structure. Shaft 32 is maintained in a vertical position by thrust bearing 36 on base plate 12 and thrust bearing 38 on the underside of upper plate 20. Fractional horsepower electric motor 40 mounted on platform 42 on base plate 12 drives shaft 32 through a drive train comprising gear box 44, gear box output drive shaft 46 with sprocket (not shown), chain 48, and sprocket 58 secured on the shaft, the latter members of the drive train being best shown in FIG. 3. Preferably, drive train includes quick-disconnect coupling 59 such as lovejoy coupling which allows motor 40 and gear box 44 to be easily removed for servicing or replacement.

Upon activation of motor 40, shaft 32 is caused to rotate within thrust bearings 36 and 38. Because nut 34 cannot rotate since it is secured on cross-piece 28, the intermeshing of the threads on shaft 32 and the interior thread on the nut causes carriage structure 24 to travel either upwardly or downwardly on support member 16 depending upon the direction of rotation of the worm gear. Preferably, nut 34 is of polymeric material such a polyamide so that the inherent frictional resistance between the threads of nut 34 and shaft 32 will prevent carriage structure 24 from descending under the combined weight of the structure and the weight of the object being lifted such as a dental seat and patient. As a consequence, loads on the drive train are reduced.

Turning now to FIG. 3, shown is a cross-sectional view of a portion of lift mechanism 10 of FIGS. 1 and 2 which illustrates the manner in which carriage structure 24 interacts with support member 16 so that carriage structure is stabilized during travel on the support member. In FIG. 3, the view is taken downwardly from a point below upper plate 20 and with cross-piece 28 and attached nut 34 removed for clarity. Carriage structure 24 is stabilized on support member 16 by the inclusion of rollers 50 and 52 which extend across the entire width of the support member thereby insuring that a significant proportion of each roller is always in contact with parallel side surfaces 18 of the support member. As was mentioned previously, side surfaces 18 of support member 16 contacted by rollers 50 and 52 have a significant width. Thus, the relatively long horizontal contact between rollers 50 and 52 and support member 16 stabilizes carriage structure 24 by tending to prevent the structure from swinging from side to side.

Rollers 50 and 52 are offset vertically from one another such that roller 50, the roller nearest to the load bearing portions of arms 26 of carriage structure 24, is below roller 52. Thus, the relative position of roller 50 and 52 to each other tends to counteract the torque caused by a load applied to the outward ends of arms 26 forming part of carriage structure 24 while still providing a low friction bearing surface on support number 16. Preferably, rollers 50 and 52 are made of long-wearing polymeric materials such as the polyamides sold under the tradenames Nylon and Delrin. The use of such materials for rollers 50 and 52 eliminates metal-to-metal contact as carriage structure 24 travels support member 16 and thereby minimizes noise caused by metal-to-metal contact. In addition, the use of polymeric materials for rollers 50 and 52 insures that the rollers will wear evenly during use.

Further stability for the carriage structure 24 in its vertical travel along support member 16 is provided by shims 54 which are located partially within milled grooves in arms 26 and which slidingly contact the side surfaces of the support member. Wear adjustment for shims 54 is provided by bolts 56 extending through arms 26 which force the shims into close engagement with side surfaces 18 of support member 16. Like rollers 50 and 52, shims 54 are preferably made of long-wearing polymeric material such as polyamides sold under the tradenames Nylon and Delrin.

As is apparent from an examination of FIGS. 2 and 3, the cooperation between support member 16 and the components of carriage structure 24 provides for a lift mechanism which is stable in all directions and which is capable of traveling smoothly up and down support 16. In addition, lift mechanism 10 is as stable at its highest elevation as it is at its lowest since the mechanism does not utilize extensible members to provide the elevating means for the mechanism.

Figure 4:
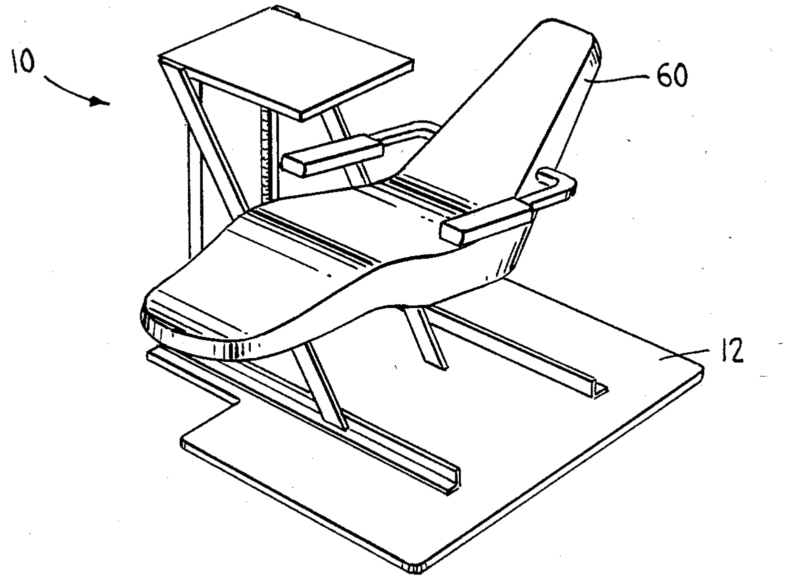
FIG. 4 is another perspective view of the lift mechanism of the invention illustrating its use in a dental chair in conjunction with a conventional type dental seat.

FIG. 4 illustrates a preferred use of lift mechanism 10 of the invention. In the Figure, conventional dental chair seat 60 has been secured to the outward ends of arms 26 of carriage structure 24. It should be noted that lift mechanism 10 enables chair seat 60 to be lowered almost to base plate 12 and raised to almost the total height of support member 16. Such a range of elevations for chair seat 60 allows a dentist of almost any height to comfortably perform dental work on a patient from either a standing and sitting position. In addition, since lift mechanism 10 is offset from the vertical axis of chair seat 60, a dentist can easily place his legs beneath the chair when working in a sitting position. Furthermore, since the movement of chair seat 60 provided by lift mechanism 10 is essentially vertical, the dentist does not have to change his horizontal position relative to a patient when adjusting the elevation of the chair seat. It should also be noted that the rugged construction and stability of lift mechanism 10 also enables the mechanism to support various dental accessories.

While lift mechanism 10 is shown in FIG. 4 for the sake of clarity as not including any external covering, it should be recognized that, for esthetic and safety reasons, the mechanism will generally be enclosed in a housing of some type. A suitable housing may be fabricated from molded polymeric material, sheet metal and the like, the particular configuration of the housing being dictated by appearance and functional factors. Generally, such a housing should conform to the exterior dimensions of lift mechanism 10 to minimize the total chair size and should contain appropriate slots to allow carriage structure 24 to travel on the support member 16.

While the present invention has been described with reference to particular embodiments thereof, it will be understood that numerous modifications may be made by those skilled in the art without actually departing from the spirit and scope of the invention as defined in the appended claims. It should also be understood that while the subject lift mechanism has been described with reference to its use as a lifting means for a dental chair seat, for which use it is particularly adapted, its utility is not thereby so limited.

It is claimed:

1. A lift mechanism comprising (a) a base plate of sufficient dimensions to provide stability for the mechanism, (b) a support member attached to the base plate and extending generally vertically from the base plate, said support member having a width relative to its height of about 1 to about 5 or less and having four generally continuous planar side surfaces, the two continuous side surfaces forming the width of the support member being parallel to each other, (c) at least one diagonal strut attached at one end near the upper portion of the support member and at the other end to the base plate, (d) a carriage structure extending generally horizontally from and traveling on said support member, said carriage structure comprising two parallel horizontal arms extending primarily in one direction from the support member and two horizontal rollers between said arms, one of said rollers contacting one of the parallel side surfaces of said support member and the other of said rollers contacting the other parallel side surface of the support member and the roller nearest to the portion of the arms extending from the support member being located lower in the carriage structure than the other roller, the width of the support member being approximately equal to the distance between the parallel horizontal arms of the carriage structure and said rollers contacting essentially the entire width of the support member, (e) a threaded shaft extending from the base plate and passing through an internally threaded nut attached to the carriage structure, and (f) means for rotating the threaded shaft so as to cause the carriage structure to travel on the support member.

2. A lift mechanism in accordance with claim 1 wherein the other opposing side surfaces of the support member are parallel to each other.

3. A lift mechanism in accordance with claim 1 which includes two parallel diagonal struts attached at one end near the upper portion of the support member and at the other end to the base plate.

4. A lift mechanism in accordance with claim 1 wherein the means for rotating the threaded shaft comprises an electric motor attached to a gear box with an output drive shaft having a sprocket, a spocket on the threaded shaft and a chain connecting the two sprockets.

5. A lift mechanism in accordance with claim 4 wherein the output drive shaft of the gear box includes a quick-disconnect coupling.

6. A lift mechanism in accordance with claim 3 wherein the arms of the carriage structure are connected by a plurality of cross-pieces.

7. A lift mechanism in accordance with claim 2 wherein the threaded shaft is supported by a thrust bearing on the base plate and another thrust bearing on an upper plate attached to the top of the support member.

8. A lift mechanism in accordance with claim 1 wherein each arm of the carriage structure contains a shim which is located partially within a groove in the arm and which slidingly contacts the side surfaces of the support member.

9. A lift mechanism in accordance with claim 8 wherein the nut, rollers and shims are of a polyamide material.

10. A lift mechanism in accordance with claim 8 wherein each shim is adjustable within the groove by means of one or more bolts extending through the arm and contacting the shim.

11. A lift mechanism in accordance with claim 10 wherein the output drive shaft of the gear box includes a quick-disconnect coupling.

12. A dental chair comprising a lift mechanism which includes (a) a base plate of sufficient dimensions to provide stability for the mechanism, (b) a support member attached to the base plate and extending generally vertically from the base plate, said support member having a width relative to its height of about 1 to about 5 or less and having four generally continuous planar side surfaces, the two continuous side surfaces forming the width of the support member being parallel to each other, (c) at least one diagonal strut attached at one end near the upper portion of the support member and at the other end to the base plate, (d) a carriage structure extending generally horizontally from and traveling on said support member, said carriage structure comprising two parallel horizontal arms extending primarily in one direction from the support member and two horizontal rollers between said arms, one of said rollers contacting one of the parallel side surfaces of said support member and the other of said rollers contacting the other parallel side surface of the support member and the roller nearest to the portion of the arms extending from the support member being located lower in the carriage structure than the other roller, the width of the support member being approximately equal to the distance between the parallel horizontal arms of the carriage structure and said rollers contacting essentially the entire width of the support member, (e) a threaded shaft extending from the base plate and passing through an internally threaded nut attached to the carriage structure, (f) means for rotating the threaded shaft so as to cause the carriage structure to travel on the support member, (g) a dental chair seat attached to the arms of the carriage structure.

13. A lift mechanism in accordance with claim 12 wherein the other opposing side surfaces of the support member are parallel to each other.

14. A lift mechanism in accordance with claim 12 wherein each arm of carriage structure contains a shim which is located partially within a groove in the arm and which slidingly contacts the side surfaces of the support member.

15. A lift mechanism in accordance with claim 14 wherein the nut, rollers and shims are of a polyamide material.

16. A lift mechanism in accordance with claim 14 wherein each shim is adjustable within the groove by means of one or more bolts extending though the arm and contacting the shim.

17. A lift mechanism in accordance with claim 4 wherein each arm of the carriage structure contains a shim which is located partially within a groove in the arm and which slidingly contacts the side surfaces of the support member.

18. A lift mechanism in accordance with claim 17 wherein the nut, rollers and shims are of a polyamide material.

19. A lift mechanism in accordance with claim 17 wherein each shim is adjustable within the groove by means of one or more bolts extending through the arm and contacting the shim.

20. A lift mechanism in accordance with claim 19 wherein the output drive shaft of the gear box includes a quick-disconnect coupling.

* * * * *